United States Patent [19]
Abramson, Jr.

[11] Patent Number: 4,659,533
[45] Date of Patent: Apr. 21, 1987

[54] PROCESS FOR THE FORMATION OF LARGE VOID-FREE THERMOPLASTIC ARTICLES

[75] Inventor: Harold C. Abramson, Jr., Bay City, Mich.

[73] Assignee: The Dow Chemical Company, Midland, Mich.

[21] Appl. No.: 776,712

[22] Filed: Sep. 16, 1985

[51] Int. Cl.$^4$ .................... B29C 35/16; B29C 45/72; B29C 71/02
[52] U.S. Cl. .................................... 264/570; 264/237
[58] Field of Search ............... 264/500, 570, 237, 348

[56] References Cited

U.S. PATENT DOCUMENTS

| | | | |
|---|---|---|---|
| 2,651,810 | 9/1953 | Snyder | 264/500 |
| 3,673,289 | 6/1972 | Gagliani | 264/348 X |
| 3,905,150 | 9/1975 | Dawn | 264/237 X |
| 4,164,523 | 8/1979 | Manning | 264/237 X |

FOREIGN PATENT DOCUMENTS

| | | | |
|---|---|---|---|
| 57-80014 | 5/1982 | Japan | 264/348 |
| 59-99618 | 6/1984 | Japan | 264/570 |

*Primary Examiner*—Jan Silbaugh
*Assistant Examiner*—Jeremiah F. Durkin, II
*Attorney, Agent, or Firm*—R. B. Ingraham; Thomas D. Zindrick

[57] ABSTRACT

Large thermoplastic articles are injection molded, cooled to a self supporting temperature, transferred to a vessel, the articles being maintained under fluid pressure sufficient to prevent the formation of voids on cooling to ambient temperature.

8 Claims, No Drawings

PROCESS FOR THE FORMATION OF LARGE VOID-FREE THERMOPLASTIC ARTICLES

In many instances it is desirable to prepare large synthetic resinous bodies suitable for processing into desired shaped articles. By large synthetic thermoplastic bodies are meant bodies having a minimal dimension of about 0.75 inch. In the injection molding of small thermoplastic bodies having thicknesses generally in the range of 0.1 inch and below, heat plastified synthetic resinous material is injected into a mold cavity wherein the heat plastified material is cooled below the heat plastification temperature and the resultant article ejected from the mold cavity to provide an article conforming very closely to the configuration of the cavity and such an article is generally void-free. However, considerable difficulty has been encountered in the injection molding of large synthetic resinous thermoplastic bodies. For example, in the preparation of a billet 12 inches in length and 3 inches in diameter by conventional injection molding procedures, the article usually has axially disposed void spaces within the molding.

A variety of techniques have been utilized to prevent or reduce the formation of such voids. Many of these techniques employ a system wherein a source of heat plastified thermoplastic material is provided to the mold in such a manner that as the molded article shrinks additional thermoplastic material is added thereto to compensate for the reduction in volume of the cooling mass and such injection or addition is usually at a pressure sufficient to not only add the thermoplastic material but to prevent the formation of voids therein. Another technique that is used is to provide a mold cavity which can be reduced in volume as the injected or compression molded thermoplastic material reduces in volume on cooling. Such approaches are set forth in the following U.S. Pat. Nos.: 2,339,452, issued Jan. 18, 1944; 2,355,613, issued Aug. 15, 1944; 2,781,547, issued Feb. 19, 1957; 2,938,232, issued May 31, 1960; 3,670,066, issued June 13, 1972; 3,809,518, issued May 7, 1974; 4,012,386, issued Mar. 15, 1977; 4,342,717, issued Aug. 3, 1982 and 4,442,061, issued Apr. 10, 1984, the teachings of which are herewith incorporated by reference thereto.

It is an object of this invention to provide an improved process for the preparation of large synthetic resinous injection moldings.

It is also an object of this invention to provide a method for the preparation of large synthetic resinous injection moldings which provide increased productivity for an injection molding machine and mold combination.

It is also an object of this invention to provide improved synthetic resinous injection moldings in a relatively rapid manner which are generally void-free.

These benefits and other advantages in accordance with the present invention are achieved in a process of the injection molding of synthetic resinous thermoplastic articles having a minimal dimension of about 0.75 inch, the steps of the method comprising heat plastifying a synthetic resinous thermoplastic composition, injecting the resultant heat plastified synthetic resinous composition into a mold, cooling at least the exterior portion of the injected thermoplastic resinous composition to a temperature at which the resultant article is self supporting, transferring the injection molded article to a pressure vessel, subjecting the molding to a fluid pressure sufficient to prevent the formation of internal voids which are visible to the naked eye while cooling the entire injection molded article below its heat plastifying temperature.

The present invention can be practiced with any resinous thermoplastic composition which shrinks on cooling from a heat plastifying temperature to a temperature below the heat plastifying temperature. Exemplary of such compositions are polystyrene, polytertiaryfluoroethylene, polyvinyldifluoride, polytetrafluoroethylene polyvinyl acetate acrylonitrile butadiene styrene resins, polypropylene, propylene polymers, polydifluoroethylene polymers, polycarbonates, copolymers of styrene and acrylonitrile, copolymers of tertiaryfluoroethylene and vinylidene fluoride and the like. Such polymers may contain various additives including stabilizers, plasticizers, fillers such as might be classified as talc and the like. In the practice of The present invention, such polymers are heat plastified in an injection molding apparatus such as ram injection molding apparatus, reciprocating screw injection molding apparatus or the like. The particular variety of injection molding apparatus is not critical. It need only be capable of heat plastifying and injecting a sufficient quantity of synthetic resinous thermoplastic material to fill the desired mold and injecting into a mold cavity of the desired size. When the thermoplastic material has been injected into the mold, it is left in the mold having sufficient time for an external surface of the molded article to cure below the heat plastifying temperature of the synthetic resinous composition and permit the resultant molded article to be handled without substantial distortion of the form. The central portion of the article, that is the part which is remote from the external surface remaining at a heat plastifying temperature, the molded article is removed from the mold and placed in a fluid pressure vessel having a heat transfer fluid therein and maintained at a pressure sufficient to prevent the formation of internal voids within the article as the temperature of the article is reduced below the heat plastifying temperature.

Processing temperatures for synthetic resinous thermoplastic materials are well known to those skilled in the art and for any particular synthetic resinous thermoplastic composition suitable temperatures are readily selected for the heat plastification thereof and for the cooling of at least the external surface of the molded article below the heat plastifying temperature of the thermoplastic composition. The temperature in the pressure vessel desirably is maintained at a temperature below the heat plastifying temperature and beneficially in most instances from 20-50 degrees below the heat plastifying temperature but at least about 30 degrees above the glass temperature of the polymer composition. The pressure required in the pressure vessel depends on the particular polymeric composition of the thermoplastic material used to injection mold the desired article. For most applications, the pressure will range from about 1,000 to about 6,000 pounds per square inch. The higher pressures are generally required for synthetic resinous thermoplastic compositions which exhibit a relatively high resistance to cold flow while the lower pressure range may be utiliized with resinous compositions that show a high degree cold flow. For example, in a higher range, polytetrafluoroethylene, and in the lower pressure range low molecular weight polyethylene. Pressures and cooling times are readily calculated in the conventional manner knowing the cold flow characteristics of the particular thermoplastic composition over a range of temperatures and the thermal conductivity of such a composition. Advantageously fluid pressure in the pressure vessel is applied by means of a liquid which is nonsolvent and a nonswelling agent for the thermoplastic composition employed in the molding. For most synthetic resinous materials, water is quite satisfactory polyglycols are also quite suitable liquids. Ethylene glycol is another suitable liquid. Other liquids such as silicone liquids, vegetable oils and the like may be utilized depending on the composition of the thermoplastic material being treated. Alternatively, gas pressure may be utilized. However, for most applications, gas under pressure such as air, nitrogen, helium, argon and the like are generally less desirable than a liquid medium for the application of pressure to the molded article.

By way of further illustration, a billet is prepared by the extrusion of heat plastified polypropylene into a mold, a ram was applied to the heat plastified mass to force it to conform to the mold. The mold had dimensions of 7 inches in diameter 7 inches long and a configuration of a cylinder. The mold temperature was about 27° C. The heat plastificated polypropylene was about 210° C. After filling the mold, the molded part was allowed to remain in the mold under pressure for about 2 hours to cause solidification of the surface of the mold sufficient to render the molding self supporting. The molding was transferred to a pressure vessel containing ethylene glycol at a temperature of 50° C., the pressure vessel closed and additional ethylene glycol added until the pressure within the vessel was about 4,000 pounds per square inch. The contents of the vessel were maintained at that temperature and pressure for a period of about 4 hours whereupon pressure was released from the vessel and the molding removed therefrom and cooled to ambient temperature. No internal voids in the molding were visible to the unaided eye.

In a manner similar to the foregoing, other synthetic resinous compositions were readily molded into large moldings without the external formation of internal voids.

As is apparent from the foregoing specification, the present invention is susceptible of being embodied with various alterations and modifications which may differ particularly from those that have been described in the precedings specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A process of the injection molding of synthetic resinous thermoplastic articles having a minimal dimension of about 0.75 inch, the steps of the method comprising heat plastifying a synthetic resinous thermoplastic composition, injecting the resultant heat plastified synthetic resinous composition into a mold, cooling at least the exterior portion of the injected thermoplastic resinous composition to a temperature at which the resultant article is self supporting, transferring the injection molded article to a pressure vessel, subjecting the molding to a fluid pressure, using a liquid, in a range of from about 1000 to about 6000 pounds per square inch, and thereby preventing the formation of internal voids which are visible to the naked eye while cooling the entire injection molded article below its heat plastifying temperature.

2. The process of claim 1 wherein the liquid is water.

3. The process of claim 1 where the thermoplastic composition is selected from the group consisting of polystyrene, polytertiaryfluoroethylene, polyvinyl acetate acrylonitrile butadiene styrene resins, polypropylene, propylene polymers, polydifluoroethylene polymers, polycarbonates, copolymers of styrene and acrylonitrile, copolymers of tertiaryfluoroethylene and vinylidene fluoride and the like.

4. The process of claim 1 wherein the synthetic resinous thermoplastic composition is a propylene polymer.

5. The process of claim 1 wherein the synthetic resinous thermoplastic composition is a polyvinyldifluoride.

6. The process of claim 1 wherein the synthetic resinous thermoplastic composition is a polytetrafluoroethylene.

7. The process of claim 1 wherein the liquid is a polyglycol.

8. The process of claim 1, wherein the liquid is ethylene glycol.

* * * * *